(12) United States Patent
Nakazawa et al.

(10) Patent No.: US 9,726,366 B2
(45) Date of Patent: Aug. 8, 2017

(54) TOUCH PAD DEVICE HAVING ILLUMINATION FUNCTION

(71) Applicant: ALPS ELECTRIC CO., LTD., Tokyo (JP)

(72) Inventors: Shunsuke Nakazawa, Miyagi-ken (JP); Suminari Ikeda, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 89 days.

(21) Appl. No.: 14/872,810

(22) Filed: Oct. 1, 2015

(65) Prior Publication Data

US 2016/0224173 A1  Aug. 4, 2016

(30) Foreign Application Priority Data

Feb. 3, 2015  (JP) ................................. 2015-018973

(51) Int. Cl.
*F21V 33/00* (2006.01)
*G06F 3/0354* (2013.01)

(52) U.S. Cl.
CPC ...... *F21V 33/0052* (2013.01); *G06F 3/03547* (2013.01)

(58) Field of Classification Search
CPC ............... G06F 3/03547; H01H 9/182; H03K 2217/960755; F21V 33/0052
See application file for complete search history.

(56) References Cited

U.S. PATENT DOCUMENTS

| 7,705,257 | B2 * | 4/2010 | Arione | H03K 17/962 200/314 |
| 7,915,553 | B2 * | 3/2011 | Arione | H03K 17/962 200/314 |
| 8,063,326 | B2 * | 11/2011 | Igarashi | H01H 13/83 200/310 |
| 2006/0072300 | A1 * | 4/2006 | Hayashi | H01H 25/065 362/23.18 |
| 2009/0090605 | A1 * | 4/2009 | Arione | H03K 17/962 200/314 |
| 2010/0155206 | A1 * | 6/2010 | Arione | H03K 17/962 200/314 |
| 2010/0315349 | A1 * | 12/2010 | Choi | G06F 3/0338 345/173 |

FOREIGN PATENT DOCUMENTS

JP  2013-239900  11/2013

* cited by examiner

*Primary Examiner* — Benjamin C Lee
*Assistant Examiner* — Xuemei Zheng
(74) *Attorney, Agent, or Firm* — Beyer Law Group LLP

(57) ABSTRACT

A touch pad device includes: an operating unit which includes an operation surface on which an operating body performs a proximity operation, and an illumination portion disposed in the operation surface; a first substrate which has a first surface and a second surface, the first surface being aligned with the operation surface and provided with a detection unit that detects the proximity operation; and a support member configured to integrally support the operating unit and the first substrate, in which the first substrate is provided so as not to overlap the illumination portion, a light source disposed in the vicinity of the illumination portion and outputs light toward the support member side is provided, and a reflective portion configured to reflect the light output from the light source toward the illumination portion is provided at a position that opposes the light source of the support member.

2 Claims, 5 Drawing Sheets

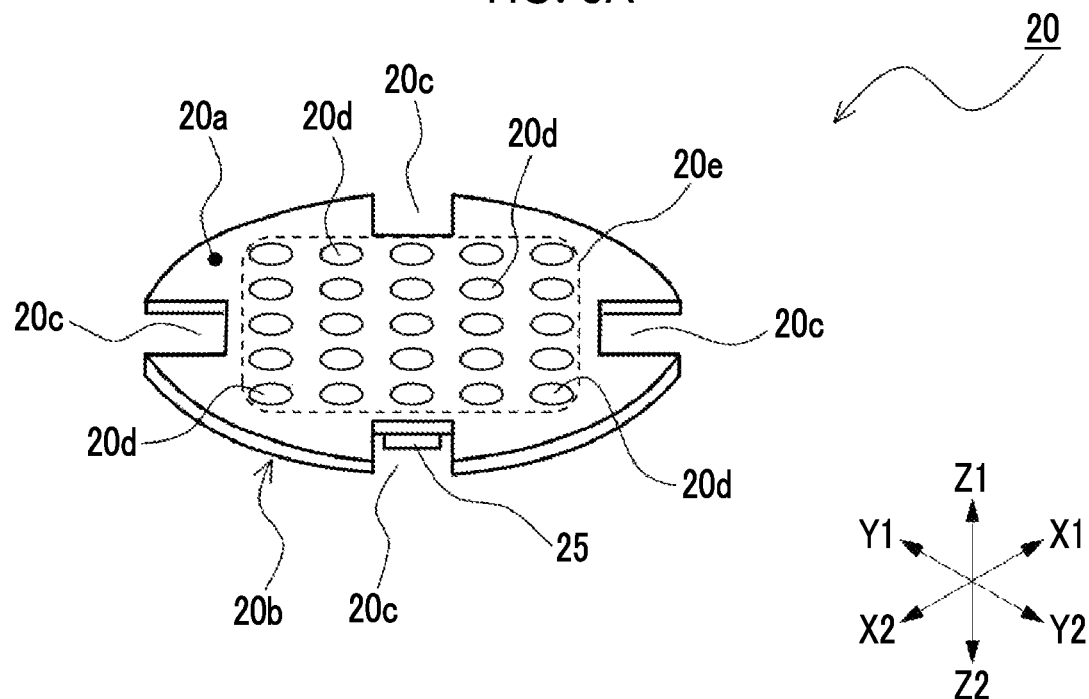
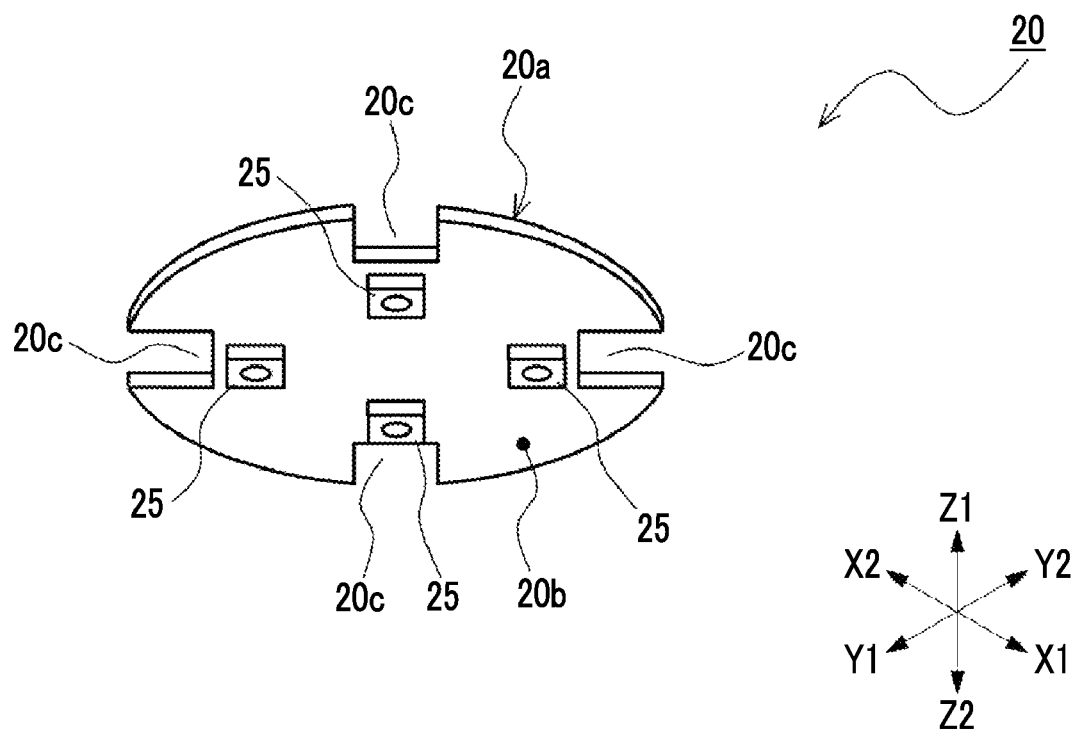

TOUCH PAD DEVICE HAVING ILLUMINATION FUNCTION

CLAIM OF PRIORITY

This application claims benefit of Japanese Patent Application No. 2015-018973 filed on Feb. 3, 2015, which is hereby incorporated by reference.

BACKGROUND OF THE INVENTION

1. Field of the Invention

The present invention relates to a touch pad device, and more particularly, to a touch pad device having an illumination function.

2. Description of the Related Art

Hitherto, an input device called a touch panel or a touch pad, which performs an input operation by detecting a proximity operation performed by an operating body such as a finger of an operator or a touch pen, is used in a portable device such as a portable phone or a tablet type terminal, or an in-vehicle device such as a navigation device. In order to enhance designability or visiblility, the input device may use illumination. However, there may be a case where it is difficult to allow a light source to directly illuminate a portion to be illuminated due to the constraints of the structure of the device or the like.

A portable device 900 provided with a touch panel described in Japanese Unexamined Patent Application Publication No. 2013-239900 (Related Art Example 1) includes, as illustrated in FIG. 5, illumination keys 908 provided outside a display area 905a of a liquid crystal display (LCD) 905 within an operable range of the touch panel. On the main substrate disposed on the rear side of the LCD 905, light-emitting diodes (LEDs) 910 are mounted on the outside of the illumination keys 908 when viewed from the front. In addition, on the front surface side of the LEDs 910, a light guiding body 911 which guides light from the LEDs 910 to the illumination keys 908 is provided. A technique of allowing the LEDs 910 which are light sources to illuminate positions in different directions than the direction of light by using the light guiding body 911 is disclosed.

However, in the example of the related art described above, the light guiding body has to be used for illumination, and thus the number of components is increased. Therefore, there is a problem in that there is concern that the number of assembly processes and costs due to the light guiding body may be increased.

SUMMARY OF THE INVENTION

The present invention provides a touch pad device having an illumination function of performing illumination without the use of a light guiding body.

A touch pad device according to an aspect of the present invention includes: an operating unit which includes an operation surface on which an operating body performs a proximity operation on one side, and an illumination portion disposed in the operation surface; a substrate which has a first surface and a second surface that have a front and rear positional relationship, the first surface being disposed to be aligned with the operation surface on the other side of the operating unit, and being provided with a detection unit that detects the proximity operation; and a support member configured to integrally support the operating unit and the substrate, in which the substrate is provided so as not to overlap the illumination portion in a plan view from the operation surface side, a light source which is disposed in the vicinity of the illumination portion on the second surface side of the substrate and outputs light toward the support member side is provided, and a reflective portion configured to reflect the light output from the light source toward the illumination portion is provided at a position that opposes the light source of the support member.

Accordingly, the reflective portion which reflects the light output from the light source toward the illumination portion is provided at the position that opposes the light source is provided on one side of the support member, and the substrate is provided so as not to overlap the illumination portion in the plan view from the operation surface side. Therefore, illumination of the illumination portion can be performed without the use of a light guiding body. Accordingly, a touch pad device having an illumination function of performing illumination without the use of a light guiding body can be provided.

In addition, the touch pad device according to the aspect of the present invention may further include a housing configured to support the support member to reciprocate in a direction intersecting the operation surface in a state where the operation surface of the operating unit is exposed.

Accordingly, since the support member is supported in the housing to reciprocate in the direction intersecting the operation surface in the state where the operating unit is exposed, the operating unit and the support portion are integrally moved when the operation surface is subjected to a pressing operation. Therefore, even when the operating unit is moved by the pressing operation, the position between the operating unit and the support member is maintained at a constant level, and thus the illumination state is not changed. Accordingly, a touch pad device having an illumination function of stably performing illumination even when the operating unit is moved by an operation can be provided.

BRIEF DESCRIPTION OF THE DRAWINGS

FIGS. 3A and 3B are views illustrating the components of a first substrate.

DESCRIPTION OF THE PREFERRED EMBODIMENTS

First Embodiment

Hereinafter, a touch pad device 100 in a first embodiment will be described.

Figure 1A:
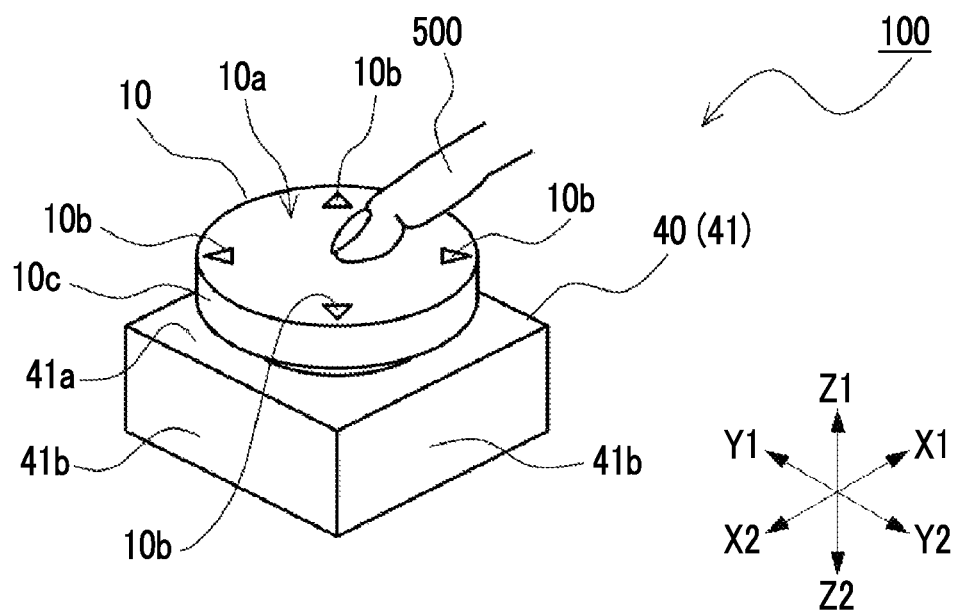
FIGS. 1A and 1B are views illustrating the appearance of a touch pad device.
Figure 1B:
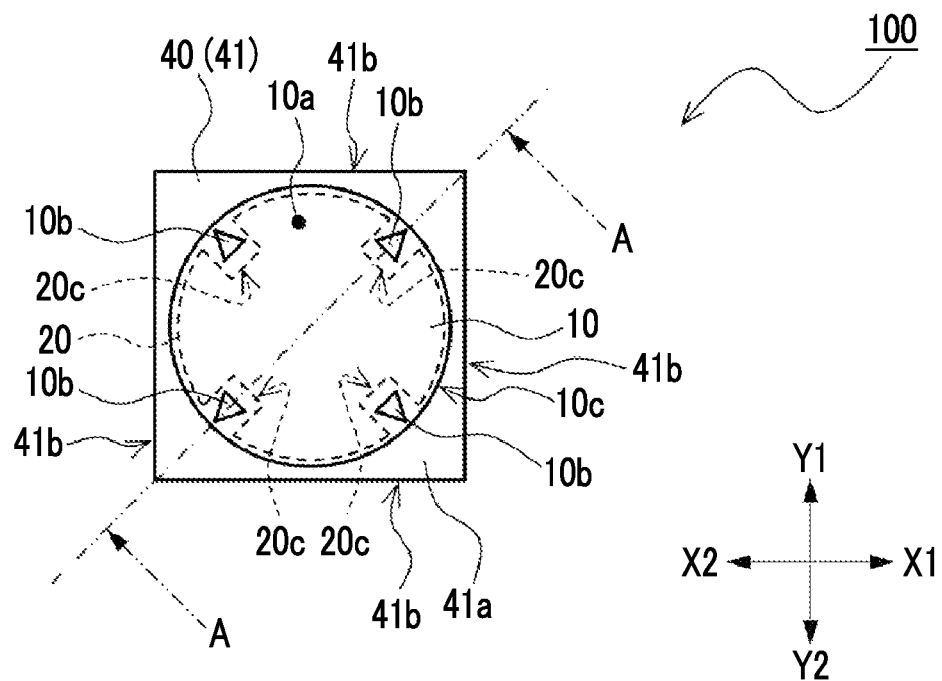
Figure 2:
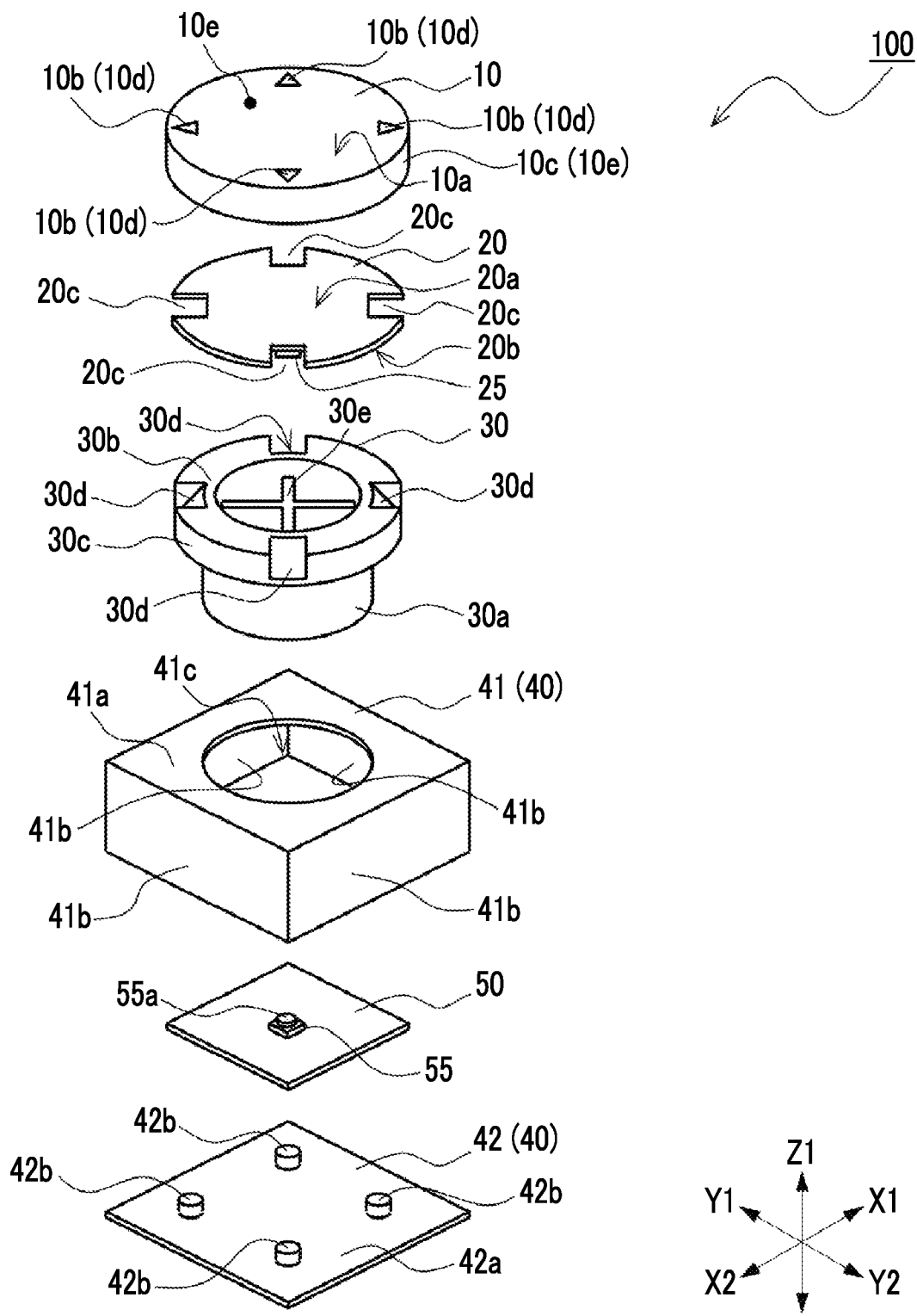
FIG. 2 is an exploded perspective view illustrating the components of the touch pad device.
Figure 4A:
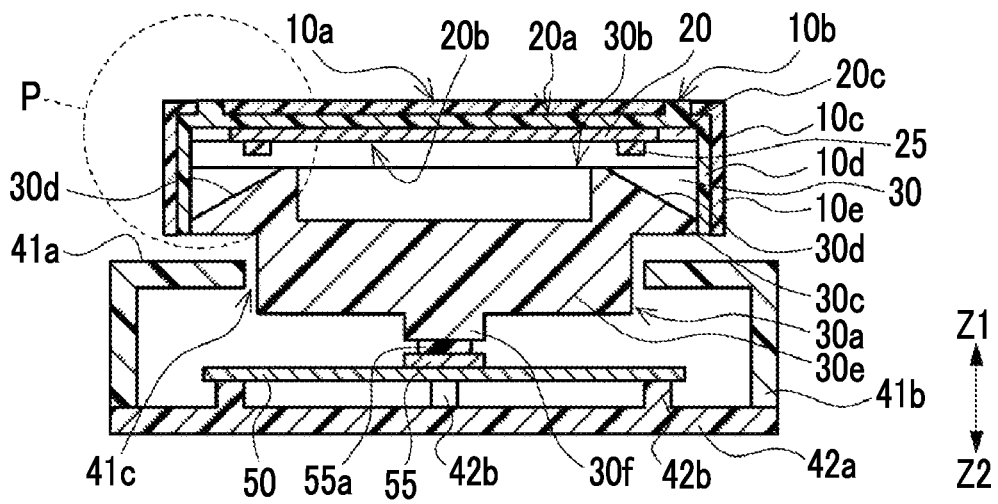
FIGS. 4A to 4C are views illustrating the structure and the operation of the touch pad device.
Figure 4B:
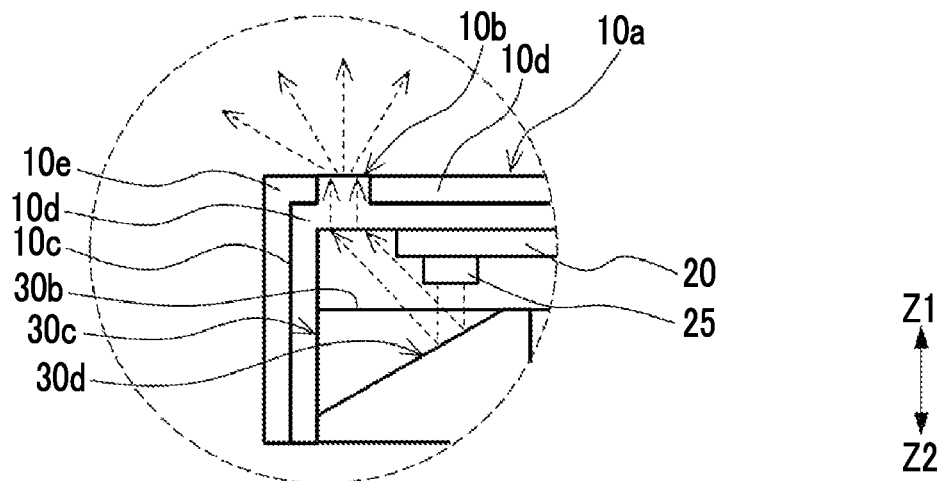
Figure 4C:
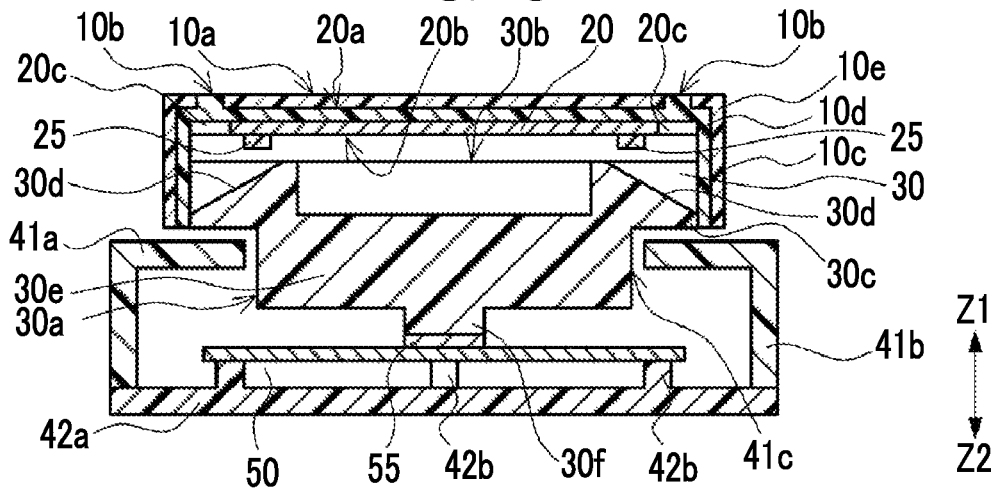
Figure 5:
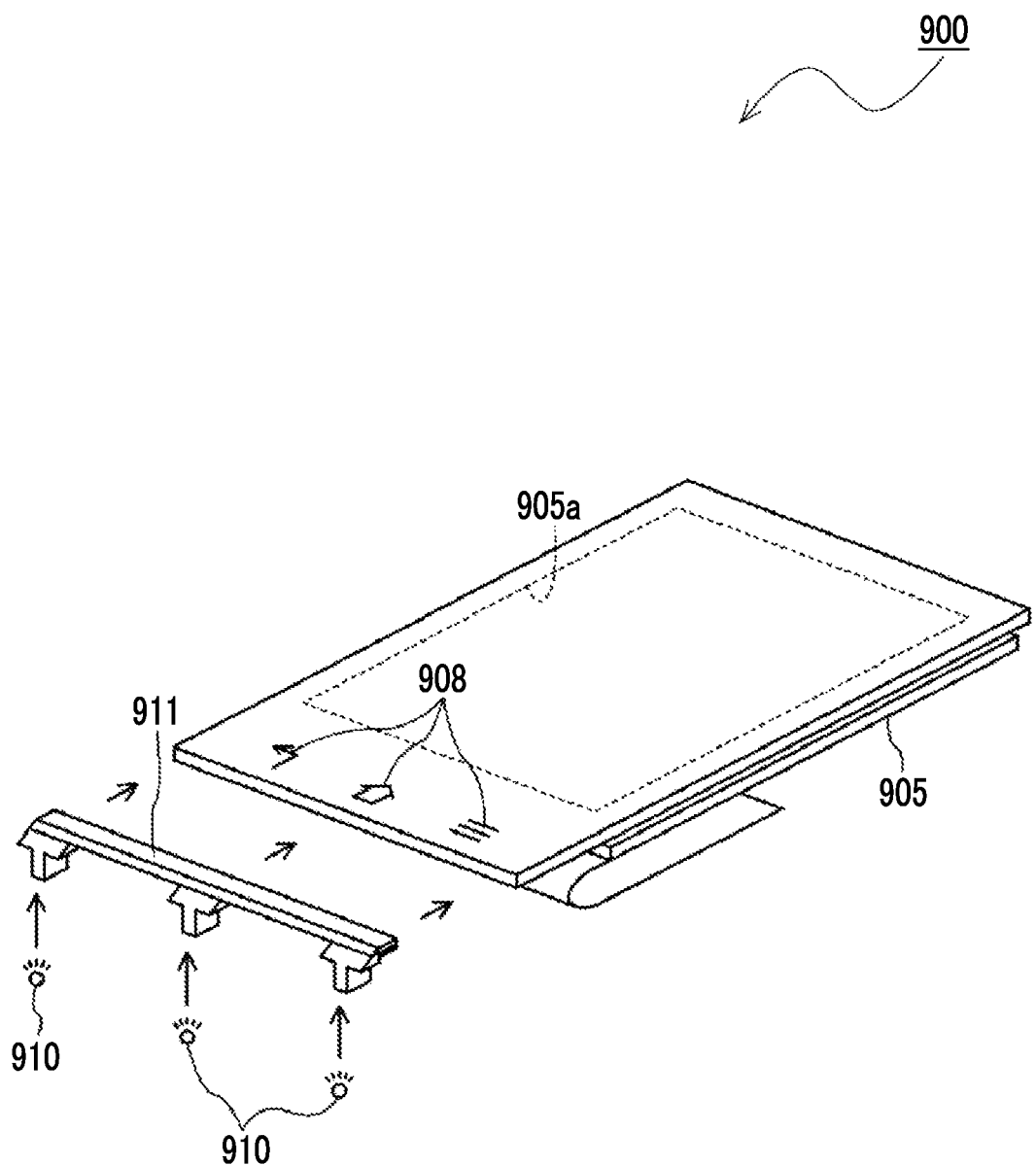
FIG. 5 is a view illustrating a portable device having a touch panel according to the related art.

First, the configuration of the touch pad device 100 in this embodiment will be described with reference to FIGS. 1A to 4C. FIGS. 1A and 1B are views illustrating the appearance of the touch pad device 100, in which FIG. 1A is a perspective view, and FIG. 1B is a plan view of the touch pad device 100 illustrated in FIG. 1A when viewed from the upper side (Z1). FIG. 2 is an exploded perspective view illustrating the components of the touch pad device 100. FIGS. 3A and 3B are views illustrating the components of a first substrate 20, in which FIG. 3A is a perspective view viewed from a first surface (Z1) side, and FIG. 3B is a perspective view viewed from a second surface (Z2) side. FIGS. 4A to 4C are views illustrating the structure and the operation of the touch pad device 100. FIG. 4A is a sectional view of the touch pad device 100 illustrated in FIG. 1B in an initial state, taken along line IVA-IVA, FIG. 4B is a view illustrating an illuminating state and is an enlarged schematic view of a P section illustrated in FIG. 4A, and FIG. 4C is a sectional view in a case where a pressing operation is performed after the state of FIG. 4A.

As illustrated in FIG. 1A, the appearance of the touch pad device 100 is formed by assembling a housing 40 having a substantially rectangular parallelepiped shape to a cylindrical operating unit 10.

In addition, as illustrated in FIG. 2, the touch pad device 100 includes the operating unit 10, a first substrate 20, a support member 30, a base body 41 and a bottom plate 42 constituting the housing 40, and a second substrate 50 accommodated in the housing 40.

The operating unit 10 is formed by two color molding so that a light guiding portion 10d made of a light-transmissive synthetic resin material having a translucent white color or the like is covered with a light shielding portion 10e made of a synthetic resin material having light shielding properties (see FIG. 4A). As illustrated in FIGS. 1A to 2, the operating unit 10 includes an operation surface 10a on which an operating body 500 performs a proximity operation in a circular shape on one side (Z1), and the operation surface 10a is provided with four triangular illumination portions 10b by exposing portions of the light guiding portion 10d from the light shielding portion 10e. In addition, the operating unit 10 includes a cylindrical outer peripheral wall 10c which extends from the outer periphery of the operation surface 10a toward the lower side (Z2), and a space in which the first substrate 20 is accommodated is formed on the inside of the outer peripheral wall 10c.

As illustrated in FIG. 2, the first substrate 20 has a first surface 20a and a second surface 20b which have a substantially circular appearance and have a "front and rear" positional relationship, and is provided with four cut-outs 20c so as not to overlap the illumination portions 10b in a plan view from the operation surface 10a side (see FIG. 1B). The first substrate 20 has a wiring pattern (not illustrated) or the like formed with a copper foil or the like on a base material such as glass epoxy, and the first surface 20a is provided with a detection unit 20e in which a plurality of detection electrodes 20d for detecting the proximity operation performed on the operating unit 10 are disposed, as illustrated in FIG. 3A. As illustrated in FIG. 3B, LEDs as light sources 25 which output light are respectively disposed in the vicinity of the cut-outs 20c on the second surface 20b side.

The support member 30 is made of the synthetic resin material, and as illustrated in FIG. 2, a cylindrical portion 30a having a hollow cylindrical shape, and an inner wall 30e provided inside the cylindrical portion 30a in a shape of a cross in the plan view from the upper side (Z1) are formed so that electrical connection means such as a flat cable is inserted therethrough. An annular upper surface portion 30b is formed at the end portion of the cylindrical portion 30a on one side (Z1), and a support portion 30c extends from the outer periphery of the upper surface portion 30b toward the other side (Z2). In the upper surface portion 30b, reflective portions 30d which have inclined surfaces directed toward the illumination portions 10b side are provided at positions where the support member 30 faces the illumination portions 10b and the light sources 25 when the operating unit 10 and the first substrate 20 are assembled to each other. The surface of the reflective portion 30d is processed to have a mirror surface and thus easily reflects light compared to other parts. In addition, as illustrated in FIG. 4A, a pressing portion 30f is formed at an end portion of the inner wall 30e on the lower side (Z2).

The base body 41 included in the housing 40 is made of the synthetic resin material, and as illustrated in FIG. 2, a top plate portion 41a having a rectangular shape and a side wall portion 41b that extends from the outer periphery of the top plate portion 41a toward the lower side (Z2) are formed so that a space in which the second substrate 50 is accommodated is formed on the inside thereof. The center portion of the top plate portion 41a is provided with a circular through-hole 41c through which the cylindrical portion 30a of the support member 30 is inserted.

The bottom plate 42 included in the housing 40 is made of the synthetic resin material, and as illustrated in FIG. 2, is provided with a cover portion 42a having a rectangular shape, and four substrate holding portions 42b having a columnar shape to hold the second substrate 50 on the upper side (Z1) of the cover portion 42a. The cover portion 42a is formed to cover a space surrounded by the side wall portion 41b on the lower side (Z2) of the side wall portion 41b of the base body 41 when the cover portion 42a is assembled to the base body 41.

The second substrate 50 has a wiring pattern (not illustrated) or the like formed with a copper foil or the like on a base material such as glass epoxy, and as illustrated in FIG. 2, has a rectangular appearance. A push switch 55 having a pressing operation portion 55a is disposed in the second substrate 50 on the upper surface side (Z1).

Next, the structure of the touch pad device 100 will be described with reference to FIGS. 1A and 1B and FIGS. 4A to 4C.

As illustrated in FIG. 4A, in the operating unit 10, the first surface 20a of the first substrate 20 is disposed on the other side (Z2) of the operation surface 10a to be aligned with the operation surface 10a and is fixed by an adhesive (not illustrated) or the like.

The inside of the outer peripheral wall 10c of the operating unit 10 is connected to the support portion 30c of the support member 30 so that the operating unit 10 and the first substrate 20 are integrally supported. When the operating unit 10 and the first substrate 20 are assembled to each other as described above, as illustrated in FIG. 1B, the cut-out 20c of the first substrate 20 is disposed at a position corresponding to the illumination portion 10b of the operating unit 10, and as illustrated in FIG. 4A, the LED which is the light source 25 provided on the second surface 20b is disposed at a position that opposes the reflective portion 30d of the support member 30.

The cylindrical portion 30a of the support member 30 is inserted through the through-hole 41c provided in the base body 41 of the housing 40. In a state in which the second substrate 50 is holed on the substrate holding portions 42b provided in the bottom plate 42, the pressing operation portion 55a of the push switch 55 disposed on the second substrate 50 supports the support member 30 toward the upper side (Z1) in a state of coming into contact with the pressing portion 30f provided n the support member 30. The support member 30 in the assembled state is supported to reciprocate in a direction intersecting the operation surface 10a (Z1-Z2 direction) in a state where the operating unit 10 is exposed on one side (Z1) in the direction intersecting the operation surface 10a (Z1-Z2 direction). In addition, in an initial state (during non-operation) the support member 30 is supported in a state of being able to be pressed against the lower side (Z2) by an operating force of the pressing operation portion 55a of the push switch 55. The first substrate 20 and the second substrate 50 are connected by a flat cable (not illustrated) or the like, and power may be supplied from the second substrate 50 toward the first substrate 20, or a signal output from the first substrate 20 may be transmitted to the second substrate 50.

Next, the operation of the touch pad device 100 will be described with reference to FIGS. 1A to 4C.

As illustrated in FIG. 1A, when the operating body 500 performs a proximity operation on the operation surface 10a of the operating unit 10, the electrostatic capacitances of the detection electrodes 20d of the detection unit 20e provided in the first surface 20a of the first substrate 20 is changed, and an operation of a touch pad can be performed by detecting a change in the electrostatic capacitances.

As indicated by broken-line arrows in FIG. 4B, when light is output from the LED which is the light source 25 provided in the second surface 20b of the first substrate 20 toward the lower side (Z2) on which the support member 30 is disposed, the output light is reflected by the reflective portion 30d toward the illumination portion 10b of the operating unit 10. The reflected light may reach the illumination portion 10b through the light guiding portion 10d and perform illumination.

When the operating unit 10 is pressed, as illustrated in FIG. 4C, the operating unit 10 and the support member 30 are integrally moved toward the lower side (Z2). Therefore, the pressing portion 30f provided in the support member 30 presses the pressing operation portion 55a of the push switch 55 so as to operate the push switch 55.

Hereinafter, the effects of this embodiment will be described.

The touch pad device 100 of this embodiment is configured so that the touch pad device 100 includes: the operating unit 10 which includes the operation surface 10a on which the operating body 500 performs the proximity operation on one side (Z1), and the illumination portion 10b disposed in the operation surface 10a; the first substrate 20 which has the first surface 20a and the second surface 20b that have the front and rear positional relationship, the first surface 20a being disposed to be aligned with the operation surface 10a on the other side (Z2) of the operating unit 10, and being provided with the detection unit 20e that detects the proximity operation; and the support member 30 configured to integrally support the operating unit 10 and the first substrate 20, in which the first substrate 20 is provided so as not to overlap the illumination portion 10b in the plan view from the operation surface 10a side, the light source 25 which is disposed in the vicinity of the illumination portion 10b on the second surface 20b side of the first substrate 20 and outputs light toward the support member 30 side is provided, and the reflective portion 30d configured to reflect the light output from the light source 25 toward the illumination portion 10b is provided at a position that opposes the light source 25 of the support member 30.

Accordingly, the reflective portion 30d which reflects the light output from the light source 25 toward the illumination portion 10b is provided at the position that opposes the light source 25 is provided on one side (Z1) of the support member 30, and the first substrate 20 is provided so as not to overlap the illumination portion 10b in the plan view from the operation surface 10a side. Therefore, illumination of the illumination portion 10b can be performed without the use of a light guiding body. Accordingly, a touch pad device having an illumination function of performing illumination without the use of a light guiding body can be provided.

In addition, the touch pad device 100 of this embodiment is configured to include the housing 40 which supports the support member 30 to reciprocate in a direction intersecting the operation surface 10a in a state where the operation surface 10a of the operating unit 10 is exposed.

Accordingly, since the support member 30 is supported in the housing 40 to reciprocate in the direction intersecting the operation surface 10a in the state where the operating unit 10 is exposed, the operating unit 10 and the support member 30 are integrally moved when the operation surface 10a is subjected to a pressing operation. Therefore, even when the operating unit 10 is moved by the pressing operation, the position between the operating unit 10 and the support member 30 is maintained at a constant level, and thus the illumination state is not changed. Accordingly, a touch pad device having an illumination function of stably performing illumination even when the operating unit 10 is moved by an operation can be provided.

In addition, since the pressing portion 30f is provided integrally with the support member 30 on the other side (Z2), in a case where the operating unit 10 is subjected to the pressing operation, the pressing portion 30f and the support member 30 can be integrally moved toward the other side (Z2) in a first direction (Z1-Z2 direction). Therefore, by disposing the push switch 55 at a position where the push switch 55 abuts the pressing portion 30f, the push switch 55 can be driven. Accordingly, a touch pad device capable of detecting a pressing operation can be formed.

While the touch pad device 100 according to the embodiment of the present invention has been described above in detail, the present invention is not limited to the above-described embodiment, and various modifications can be made without departing from the gist. For example, the following modifications can be made, and these modifications belong to the technical scope of the present invention.

(1) In this embodiment, an example of forming the operating unit by performing two color molding of a light-transmissive synthetic resin material having a translucent white color or the like and a synthetic resin material having light shielding properties is described. However, a modification in which a light-transmissive light guiding portion is coated with a paint having light shielding properties may also be employed.

(2) In this embodiment, an example in which the surface of the reflective portion is subjected to mirror surface processing is described. However, a modification in which the surface thereof is coated with reflective paint or is subjected to plating may also be employed.

(3) In this embodiment, an example in which the light source is an LED is described. However, a modification in which a light emitting element other than the LED, such as a light bulb is employed may also be employed.

(4) In this embodiment, an example in which the push switch is used to detect the pressing operation is described. However, the pressing operation may also be detected by using a pressure sensor.

It should be understood by those skilled in the art that various modifications, combinations, sub-combinations and alterations may occur depending on design requirements and other factors insofar as they are within the scope of the appended claims of the equivalents thereof.

What is claimed is:

1. A touch pad device comprising:
an operating unit including:
an operation surface on which an operating body performs a proximity operation from a first side of the operation surface, and
an illumination portion provided on the operation surface;
a substrate provided on a second side of the operation surface opposite to the first side, the substrate having a first surface and a second surface opposite to the first surface, the first surface facing the operation surface from the second side of the operation surface;
a support member provided under the substrate so as to support the operating unit and the substrate;
a housing configured to accommodate the operating unit such that the operation surface is exposed, and to support the support member such that the support member reciprocates up and down relative to the housing so as to move the operating unit up and down relative to the housing;
a detection unit provided on the first surface of the substrate and configured to detect the proximity operation of the operating body;
a light source provided on the second surface of the substrate and configured to output light toward the support member; and
a reflective portion provided on the support member at a position opposing the light source, the reflective portion being configured to reflect the light output from the light source toward the illumination portion, wherein the substrate has a cutout provided at a position corresponding to the illumination portion such that the light reflected by the reflective portion reaches the illumination portion through the cutout.

2. The touch pad device according to claim 1, wherein the illumination portion is made of a light-transmitting material.

* * * * *